(12) United States Patent
Mena

(10) Patent No.: US 6,485,180 B2
(45) Date of Patent: Nov. 26, 2002

(54) EXPANDABLE RACK BUSHING

(75) Inventor: Rodolfo Mena, Juarez Chih (MX)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/756,646

(22) Filed: Jan. 4, 2001

(65) Prior Publication Data

US 2002/0085778 A1 Jul. 4, 2002

(51) Int. Cl.[7] .............................................. F16C 23/04
(52) U.S. Cl. ........................ 384/222; 384/38; 384/215
(58) Field of Search ............................. 384/10, 26, 29, 384/37, 38, 42, 215, 220, 222

(56) References Cited

U.S. PATENT DOCUMENTS

| | | | | |
|---|---|---|---|---|
| 3,333,513 A | * | 8/1967 | Wettstein | 384/29 |
| 3,966,276 A | * | 6/1976 | Bellarbre et al. | 384/215 |
| 4,208,075 A | * | 6/1980 | Templeton | 384/29 |
| 4,513,990 A | * | 4/1985 | Morita et al. | 384/29 |
| 5,383,811 A | * | 1/1995 | Campbell et al. | 384/42 |
| 5,758,545 A | * | 6/1998 | Fevre et al. | 384/42 |
| 5,797,685 A | * | 8/1998 | Jurik et al. | 384/215 |
| 6,113,275 A | * | 9/2000 | Blase | 384/42 |

FOREIGN PATENT DOCUMENTS

JP             58-180832         * 10/1983

* cited by examiner

Primary Examiner—Thomas R. Hannon
(74) Attorney, Agent, or Firm—Edmund P. Anderson

(57) ABSTRACT

The expandable rack bushing has a tubular portion with front slots and rear slots. An axial overlap between the front and rear slots permits expansion and retraction of the tubular portion. Retainer blocks on the tubular portion are received in a radial groove in a rack and pinion housing to axially fix the rack bushing. When the steering rack is positioned in the rack bushing, the retainer blocks cannot be removed from the radial groove. Radial forces on the steering rack expand the rack bushing and move the steering rack toward one side of the rack housing bore. Spring fingers absorb energy as the rack bushing is expanded. These spring fingers continuously urge the steering rack toward the housing bore center.

13 Claims, 3 Drawing Sheets

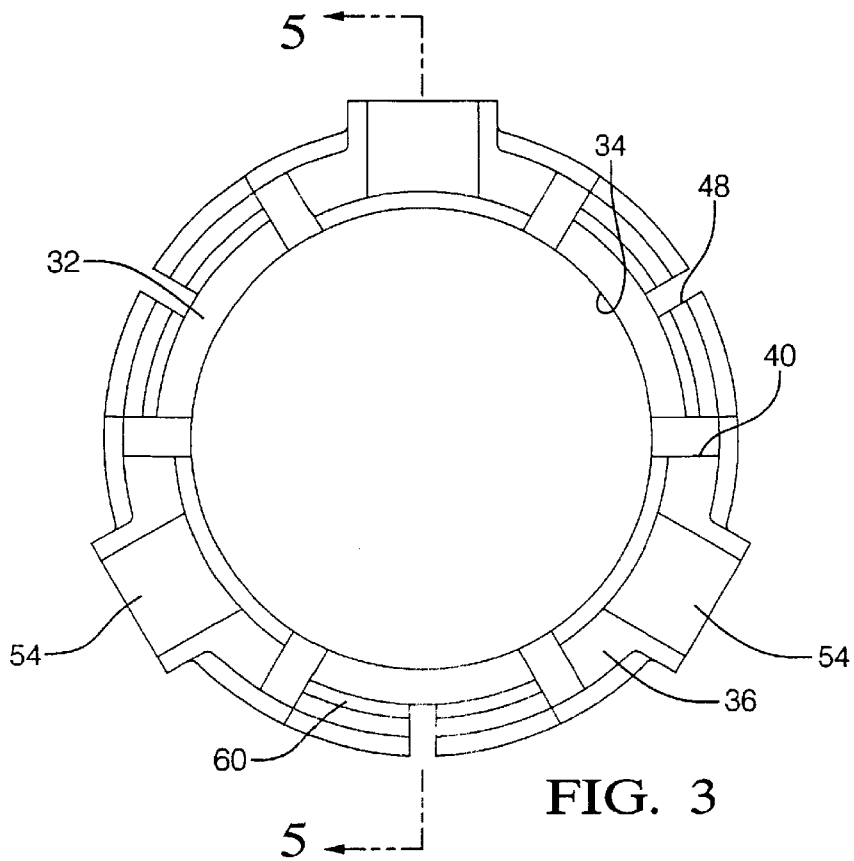
FIG. 3
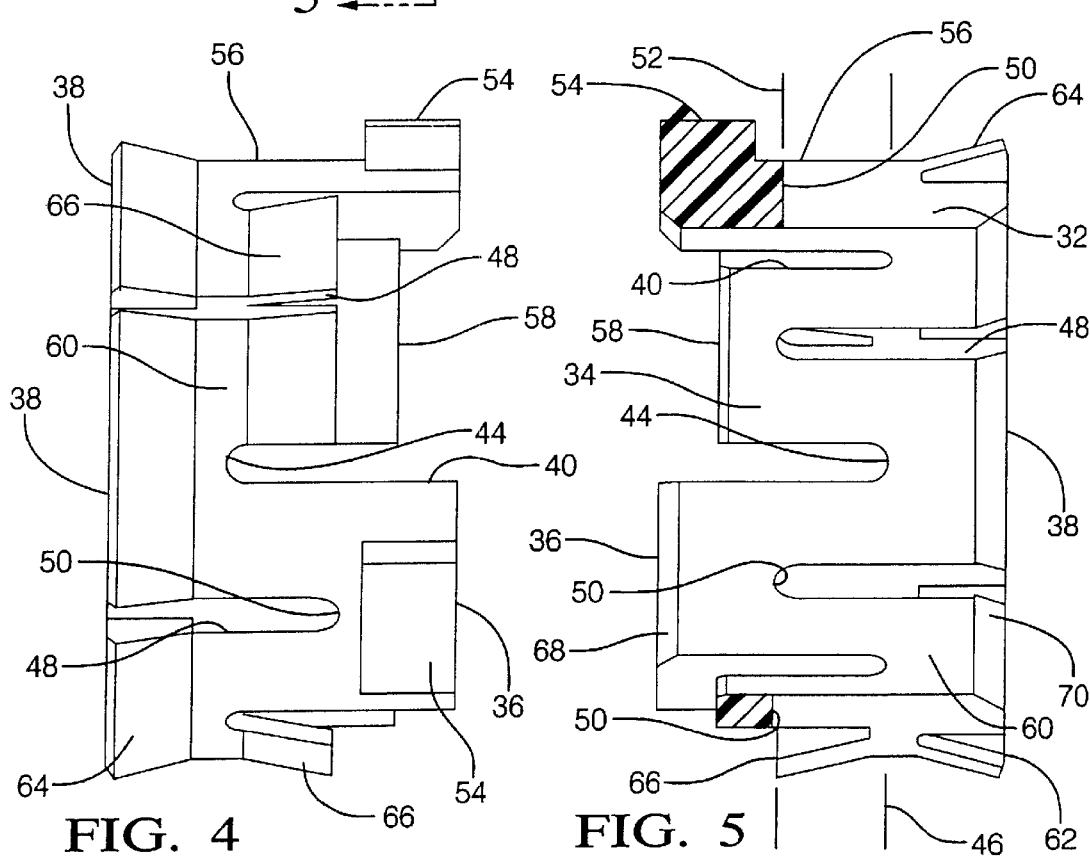
FIG. 4
FIG. 5

EXPANDABLE RACK BUSHING

TECHNICAL FIELD

The expandable rack bushing guides, cushions and dampens the rack of a rack and pinion vehicle steering system.

BACKGROUND OF THE INVENTION

The rack of a rack and pinion vehicle steering system is slidably mounted in a rack and pinion housing secured to a vehicle frame. A rack bushing is provided in the rack and pinion housing to guide one end of the rack as it moves parallel to the rack axis. The other end of the rack is supported and guided by rack and pinion engaging teeth. A tie rod assembly is connected to a first end of the rack and to wheel steering arm. A second tie rod assembly is connected to a second end of the rack and to another wheel steering arm.

Wheel steering arms are connected to steered wheels and move with the steered wheels to which they are attached. Since the steered wheels of most vehicles are connected to a vehicle frame by a suspension system there is a substantial range of movement between a wheel steering arm and the steering rack of a rack and pinion steering assembly. To accommodate the movement between a steering arm and a steering rack, a tie rod with ball connectors transmits force between the steering rack and a steering arm. The direction in which force is transmitted to the tie rod by the steering rack is usually at an angle relative to the steering rod axis. Bending loads are therefore applied to the steering rack when the steering rack is moved to change the direction of movement of a vehicle.

Forces are transmitted from road surfaces to tires and wheels, steering arms, tire rods and a steering rack. These forces, that are transmitted to the steering rack, are seldom if ever parallel to the rack axis. The bending loads on a steering rack, that are induced by road surfaces, are variable in both magnitude and direction. The result of the steering rack bending loads is vibrations, noise, gear teeth damage and bushing failures.

Bushings employed with some steering racks tend to slide with the steering rack relative to a rack and pinion housing. The movement of the bushings relative to the housing generates noise, increases wear and eventually results in bushings being forced out of the rack and pinion housing.

The bushings that have been used to support steering racks in rack and pinion housings in the past tend to wipe lubricant from the rack. After lubricant is removed from bushings and bushing contact surfaces on a steering rack, friction forces increase and it takes more effort and strength to turn the steered wheels of a vehicle. A critical side effect of poor lubrication is wear on the rack bushing. Severe wear creates excessive radial clearance, which is a main cause of noise.

SUMMARY OF THE INVENTION

The expandable rack bushing has a generally tubular portion with a bushing axis, an outer end and an inner end. A plurality of front slots, in the generally tubular portion, each extend from the outer end toward the inner end and to a front slot end wall. A plurality of rear slots, in the generally tubular portion, each extend from the inner end toward the outer end and to a rear slot end wall. At least some of the rear slot end walls are axially positioned between some of the front slot end walls and the outer end. The slots permit the diameter of the expandable rack bushing to increase. A plurality of spring members on the generally tubular portion absorb forces expanding the generally tubular portion and bias the generally tubular portion toward a non-expanded condition.

A plurality of retainer blocks on the generally tubular portion of the expandable rack bushing extend radially outward from the generally tubular portion. These retainer blocks are received in a groove in a rack housing bore to axially position and retain the rack bushing.

BRIEF DESCRIPTION OF THE DRAWINGS

These and other features and disadvantages of the present invention will become more readily appreciated when considered in connection with the following detailed description and appended drawings, wherein:

FIG. 3 is front elevational view of the expandable rack bushing;

FIG. 4 is a side elevational view of the expandable rack bushing;

FIG. 5 is a sectional view of the expandable rack bushing taken along lines 5—5 in FIG. 3;

DETAILED DESCRIPTION OF THE PREFERRED EMBODIMENT

Figure 1:
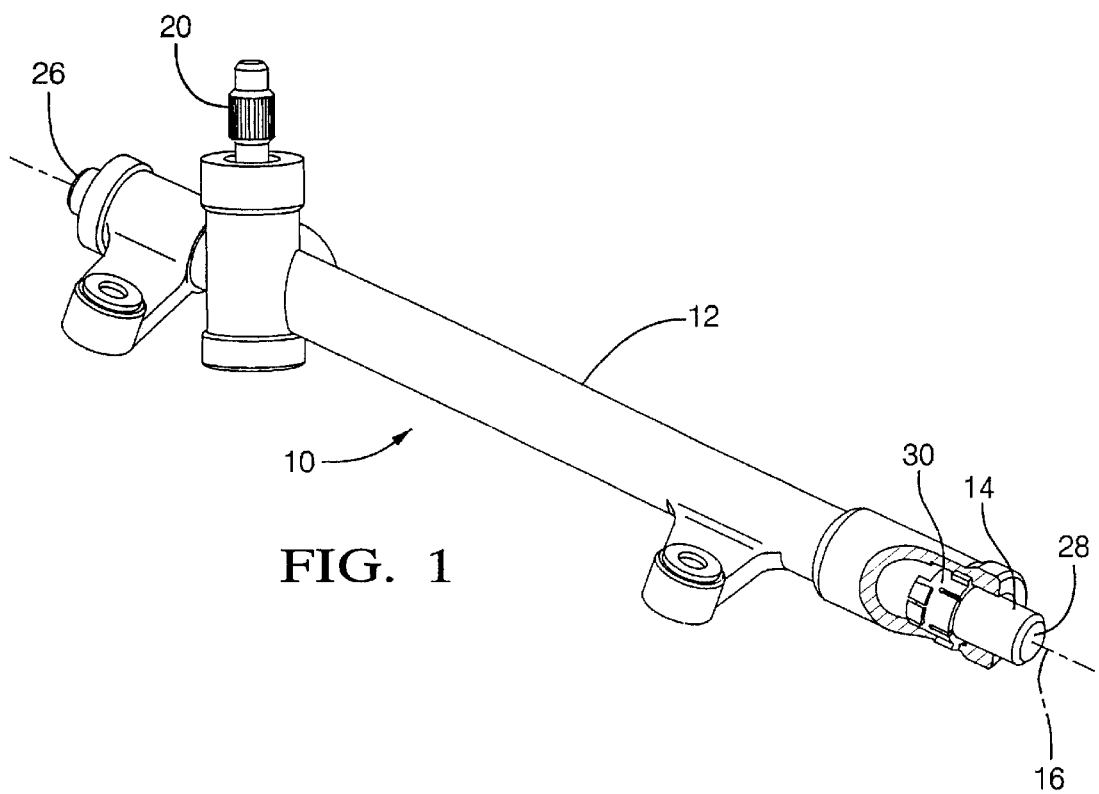
FIG. 1 is a perspective view of a vehicle steering system rack and pinion assembly.
Figure 2:
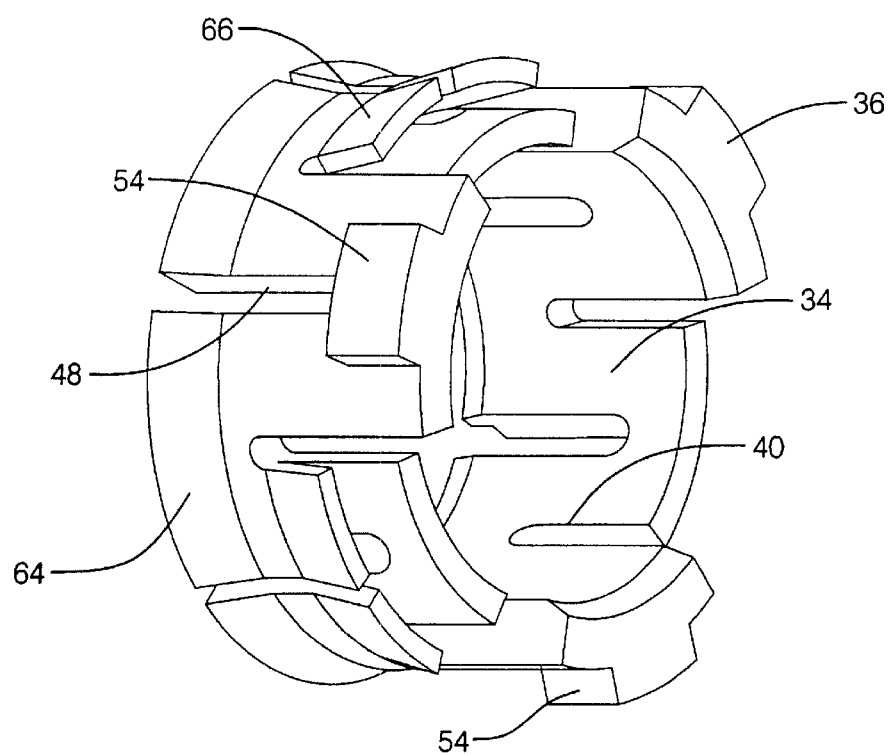
FIG. 2 is a perspective view of an expandable rack bushing.
Figure 6:
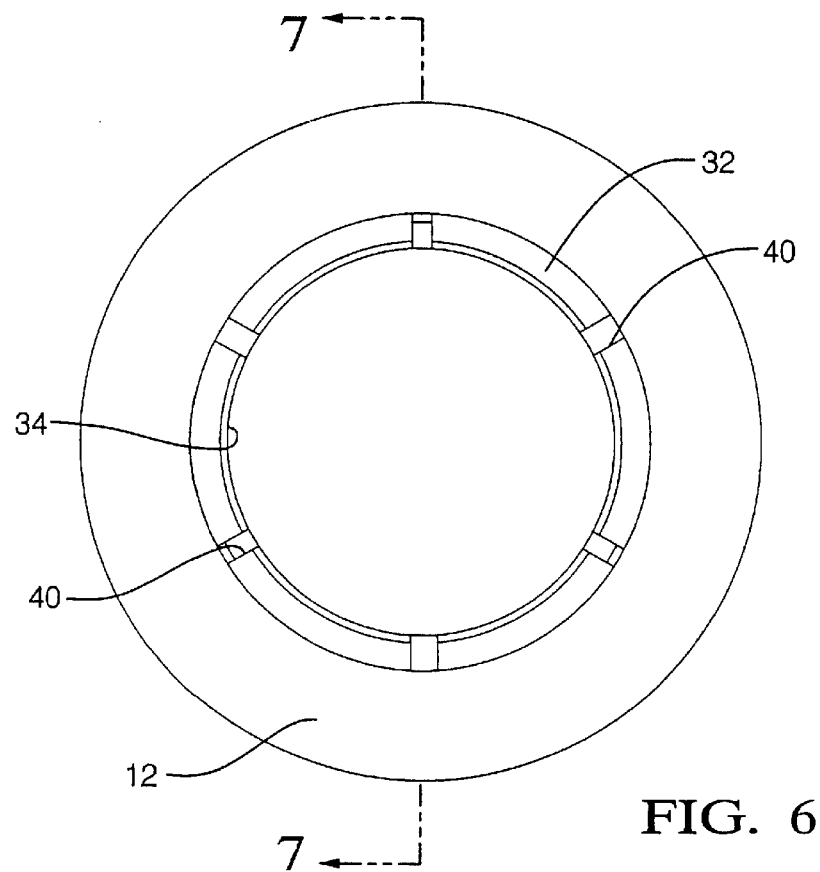
FIG. 6 is front elevational view of the expandable rack bushing in a rack and pinion housing.
Figure 7:
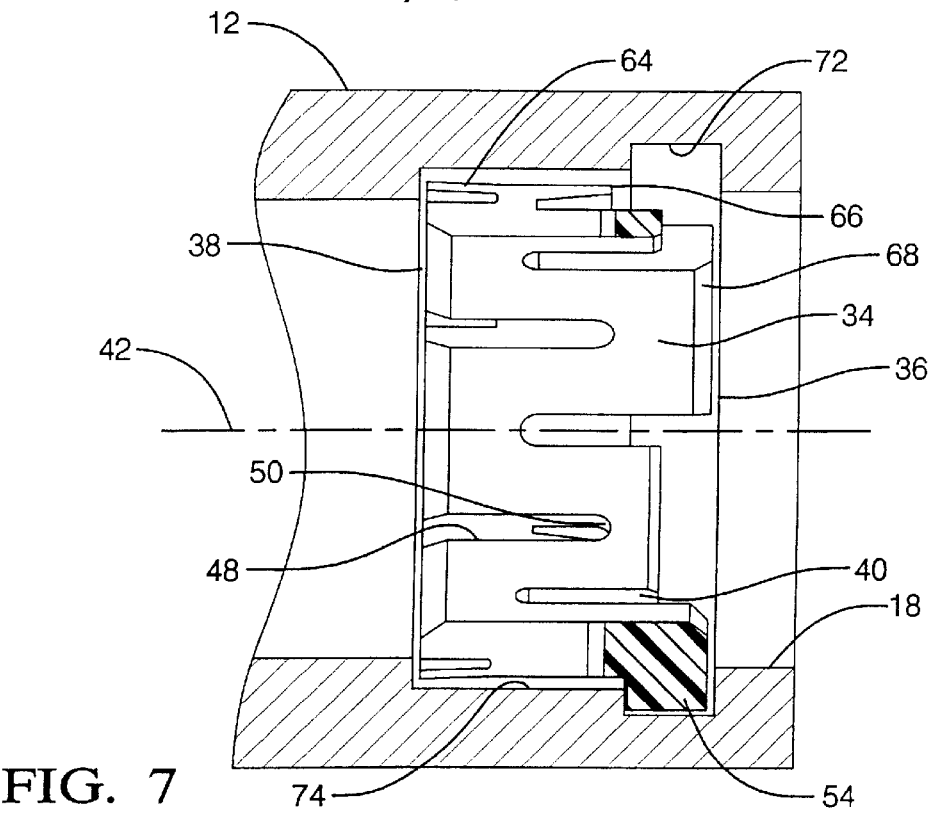
FIG. 7 is a sectional view taken along lines 7—7 in FIG. 6 with parts broken away and the steering rack removed.

The rack and pinion steering assembly 10 for a vehicle as shown in FIG. 1 has a rack and pinion housing 12. A steering rack 14 is slidably mounted in the rack and pinion housing 12 for axial movement along a rack axis 16. A drive pinion 20 is journalled in the rack and pinion housing 12. Rotation of the pinion 20 will move the steering rack 14 axially in one direction or the other. A first rack end 26 on the steering rack 14 extends out one end of the rack and pinion housing 12. A second rack end 28 extends out another end of the rack and pinion housing 12. The second rack end 28 is supported and guided by one expandable rack bushing 30. The rack busing 30 is mounted inside the rack and pinion housing 12 adjacent to the second rack end 28. An inner tire rod assembly (not shown) is attached to the first rack end 26. Another inner tire rod assembly (not shown) is attached to the second rack end 28.

The rack bushing 30 has a generally tubular portion 32 with a cylindrical inner wall surface 34. The tubular portion 32 has a bushing axis 42 that is coaxial with the rack axis 16 when the steering rack 14 is not forced out of a centered position in the rack housing bore 18. The inside diameter of the tubular portion 32 is preferably slightly larger than the diameter of the steering rack 14. However, the rack bushing 30 can be expanded or contracted to change the diameter as explained below. The rack bushing 30 also has an outer end 36 and an inner end 38. The axial length of the bushing 30 extends from the outer end 36 to the inner end 38.

A plurality of front slots 40 in the tubular portion 32 extend axially from the outer end 36 toward the inner end 38. Each of the front slots 40 has a front slot end wall 44 that is in a front slot end wall plane 46. The front end wall 44 is preferably positioned about two thirds of the distance from the outer end 36 to the inner end 38 away from the outer end. There are six front slots 40 that are spaced 60 degrees apart around the circumference of the tubular portion 32.

A plurality of rear slots 48 in the tubular portion 32 extend axially from the inner end 38 toward the outer end 36. Each of the rear slots 48 has a rear slot end wall 50 that is in a rear slot end wall plane 52. The rear end walls 50 are preferably positioned about two thirds of the distance from the outer end 36 to the inner end 38 away from the inner end. There are six rear slots 48 that are 60 degrees apart around the circumference of the tubular portion 32. Each rear slot 48 is half way between two adjacent front slots 40. As described and shown, the front slot end walls 44 are axially positioned between the rear slot end wall 50 and the inner end 38. The rear slot end walls 50 are axially positioned between the front slot end walls 44 and the outer end 36. The front slots 40 and the rear slots 48 therefore axially overlap. The overlap permits the diameter of the tubular portion 32 to be forced to either increase or decrease when the bushing 30 is made from a resilient material.

Retainer blocks 54 are provided on the outer end 36 of the bushing 30. As shown in the drawing there are three retainer blocks 54. Each retainer block 54 extends radially outward from a cylindrical outer wall surface 56 of the tubular portion 32. The retainer blocks 54 are centered on three of the rear slots 48 and have centers that are spaced 120 degrees apart about the rack axis 16. Sections of the tubular portion 32, that are between front slots 40 and also between two front slots without a retainer block 54 between them have recessed outer ends 58 that are axially positioned between the inner end 38 and the outer end 36.

A bridge 60 extends circumferentially between adjacent rear slots 48. The front slots 40 extend into the bridges 60 a short distance. A rear bridge wall 62 of each bridge 60 is axially positioned between the front slot end walls 44 and the inner end 38. An inner spring finger 64 is integral with each bridge 60 and extends radially outward and axially inward from the bridge to which it is attached to the inner end 38. The inner spring fingers 64 also extend circumferentially from one rear slot 48 to the next rear slot.

An outer spring finger 66 extends radially outward and axially toward the outer end 36 from each bridge 60 that is between two adjacent front slots 40 and between two adjacent blocks 54. The rear slots 48 extend axially through the outer spring fingers 66 and divide each outer spring finger into two arcuate parts. The rear slots 48 also pass through the inner spring fingers 64.

An outer chamfer 68 is provided between the radially inner wall surface 34 and each outer end 36. An inner chamfer 70 is provided between the cylindrical inner wall surface 34 and the inner end 38. These chamfers 68 and 70 facilitate the insertion of a steering rack 14 into the rack bushings 30. If necessary the steering rack 14 can expand the rack bushing 30 when the rack is inserted through the bushings.

The rack bushing 30 is compressed into a smaller diameter for insertion axially into the rack and pinion housing 12. The axial overlap between the front slots 40 and the rear slots 48 permit the bushings to be compressed and to expand. Upon reaching a housing radial groove 72, the resiliency of the rack bushing 30 urges the retainer blocks 54 radially outward and into the groove. After the steering rack 14 is inserted into the bushing 30, the retainer blocks 54 positively lock the bushings in the rack and pinion housing 12.

The outer spring fingers 66 and the inner spring fingers 64 either contact the inside bore 74 in the rack and pinion housing 12 or they are immediately adjacent to the inside bore. The front slots 40 and the rear slots 48 hold lubricant and keep the steering rack 14 lubricated to reduce friction between the rack and the bushing 30 and to reduce wear. The front slots 40 and the rear slots 48 also permit air to move into and out of the rack and pinion housing 12 to equalize the inside and outside air pressures.

During operation of a vehicle with a rack and pinion steering assembly 10, bending loads on the steering rack 14 due to steering forces or to forces induced from a road surface on steered tires and wheels first tend to move the first and second rack ends 26 and 28 radially in the rack and pinion housing 12. The inner and outer spring fingers 64 and 66 of the bushing 30 as well as the tubular portion 32 are deformed to permit radial movement of the steering rack 14 and absorb shock loads. The diameter of the bushing 30 is expanded and cylindrical wall surface 34 is distorted by the bending forces. As soon as the peak radial or bending loads on the ends 26 and 28 of the steering rack 14 start to decrease, the spring fingers 64 and 66 start urging the steering rack 14 back to the axial center of the rack housing bore 18. The bushing 30 thereby absorbs forces, dampens the forces applied to the steering rack 14 and return the steering rack 14 to a radially centered position in the housing bore 18. By absorbing forces exerted on the steering rack 14, the rack bushing 30 absorb energy, dampen radial movement of the steering rack and thereby reduce vibrations and noise.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. An expandable rack bushing comprising:
   a generally tubular portion with a bushing axis, an outer end, and an inner end;
   a plurality of front slots in said generally tubular portion each of which extends from the outer end toward the inner end and a front slot end wall;
   a plurality of rear slots in said generally tubular portion each of which extends from the inner end toward the outer end to a rear slot end wall and wherein at least some of the rear slot end walls are axially positioned between some of the front slot end walls and said outer end and permit a diameter of said expandable rack bushing to increase; and
   a plurality of retainer blocks on said generally tubular portion each of which extends radially outward from said generally tubular portion.

2. An expandable rack bushing as set forth in claim 1 including a plurality of spring members on said generally tubular portion that absorb forces urging expansion of said generally tubular portion and bias said generally tubular portion toward a non-expanded condition.

3. An expandable rack busing as set forth in claim 2 wherein the plurality of spring members include a plurality of inner spring fingers that extend radially away from said generally tubular portion and axially toward said inner end.

4. An expandable rack bushing as set forth in claim 2 wherein the plurality of spring members include a plurality of spring fingers that extend radially away from said generally tubular portion and axially toward said outer end.

5. An expandable rack bushing as set forth in claim 2 wherein the plurality of spring members are integral with said generally tubular portion.

6. An expandable rack bushing as set forth in claim 1 wherein the plurality of front slots and the plurality of rear slots are parallel to said bushing axis.

7. An expandable rack bushing as set forth in claim 1 wherein the plurality of front slots includes at least six front slots and the plurality of rear slots includes at least six rear slots and wherein each of the front slots is adjacent to and between two rear slots.

8. An expandable rack bushing as set forth in claim 1 wherein the plurality of retainer blocks includes at least three retainer blocks.

9. An expandable rack bushing comprising:
- a generally tubular portion with a bushing axis, an outer end, and an inner end;
- a plurality of front slots in said generally tubular portion each of which extends from the outer end toward the inner end and to a front slot end wall;
- a plurality of rear slots in said generally tubular portion each of which extends from the inner end toward the outer end and to a rear slot end wall and wherein at least some of the rear slot end walls are axially positioned between some of the front slot end walls and said outer end and permit a diameter of said expandable rack bushing to increase; and
- a plurality of spring members on said generally tubular portion that absorb forces expanding said generally tubular portion and bias said generally tubular portion toward a non-expanded condition.

10. An expandable rack bushing as set forth in claim 9 wherein the plurality of spring members include a plurality of spring fingers that extend radially away from said generally tubular portion and axially toward said inner end.

11. An expandable rack bushing as set forth in claim 9 wherein the plurality of spring members include a plurality of outer spring fingers that extend radially away from said generally tubular portion and axially toward said outer end.

12. An expandable rack bushing as set forth in claim 9 wherein the plurality of spring members includes a plurality of spring fingers that are integral with said generally tubular portion and that have spring finger free ends spaced radially outward from said generally tubular portion.

13. An expandable rack bushing as set forth in claim 9 wherein the plurality of front slots and the plurality of rear slots are parallel to said bushing axis.

* * * * *